Patented Feb. 17, 1925.  1,526,971

UNITED STATES PATENT OFFICE.

WILLIAM FELDENHEIMER, OF LONDON, AND WALTER WILLIAM PLOWMAN, OF EAST SHEEN, ENGLAND.

PURIFICATION OF CLAY.

No Drawing.  Application filed March 26, 1923. Serial No. 627,704.

*To all whom it may concern:*

Be it known that we, WILLIAM FELDENHEIMER, a subject of the King of England, residing in London, England, and WALTER WILLIAM PLOWMAN, a subject of the King of England, residing in East Sheen, in the county of Surrey, England, have invented certain new and useful Improvements in the Purification of Clay, of which the following is a specification.

The present invention is for improvements in and relating to the purification of clay.

As is well known, certain clays may be purified by peptonization of the clay substance with the aid of a dilute solution of an alkaline hydrate such as caustic soda, the suspended clay being separated from the unpeptized impurities. It is doubtful, however, whether any given reagent can be predicted to be a practicable peptonizing agent for all clays, and in common with other peptonizers alkaline hydrates are not successfully applicable to some clays. The clay suspensions produced by these reagents may be insufficiently stable to permit of satisfactory sedimentation and separation of the non-peptonized impurities, and the deposits of the latter may be uncompact and therefore more or less readily miscible with the adjacent supernatant suspension. In some cases also, the difference between the minimum and maximum concentrations of the hydrate which are necessary for maintaining the clay in satisfactory suspension is too small for convenient working on the commercial scale.

We have now found that if the alkaline hydrate solution be modified as hereinafter described more stable suspensions than those usually produced by the alkali alone may be obtained, and that the sediments are in general better compacted and differentiated from the supernatant liquor.

According to the present invention, a process for the purification of clay wherein the clay substance is peptonized with the aid of an aqueous solution of caustic alkali, and the clay suspension is separated from the unpeptonized impurities, is characterized by admixing the clay to be purified with a dilute caustic alkali solution (for example, a solution of caustic soda) which contains the hydrate of an alkaline-earth (for example, calcium hydrate) only in sufficient quantity to give a more stable suspension of the clay substance and a better differentiation therefrom (for instance, a more compact deposit) of the unpeptonized matter than are obtainable with a dilute solution of caustic alkali alone.

For instance, the clay may be admixed with water containing per each ton of clay present about 0.5–1.0 lb. of dissolved hydrate of lime and about 1–2 lbs. of caustic soda in the appropriate dilution which, as is recognized in the art, is necessary for effecting the peptonization of clay.

In the case of calcium hydrate, it has been found that the maximum quantity should as a general rule not exceed about half the weight of the caustic alkali, and less than this may be employed according to the behaviour of the particular clay under treatment. The limited solubility in water of alkaline-earth hydrates is compensated by the fact, well-known in the art, of the attenuated nature of the solutions required for the peptonization of clay.

The suspension of clay may be separated from any unpeptonized impurities and the clay recovered in any desired manner.

This invention also comprises a process for the treatment of clay wherein the latter is prepared under sterile conditions by contact with a solution of a hypochlorite. Thus, the clay be treated with a solution of mixed hydrates as aforesaid in presence of a soluble hypochlorite. Such treatment has also the effect of bleaching or conserving a light colour in the clay, or deodorizing the latter, results which increase the value of the purified product for different applications, such as the refining of edible oils and for therapeutical and surgical uses.

The clay may be admixed with the supernatant liquor (appropriately diluted, as may be required according to the nature of the clay under treatment) obtained by the interaction of an alkaline-earth hypochlorite (for example, bleaching powder) and caustic alkali in excess of 2 molecular proportions of the alkali (preferably from 3–4 molecular proportions) to 1 molecular proportion of the hypochlorite, in presence of a suitable proportion of water, for example, a quantity to provide not substantially more than half as much by weight of dissolved alkaline-earth hydrate as of the free caustic alkali in solution.

It will be appreciated that in virtue of the small solubility of alkaline-earth hydrates in water the total quantity in solution in the supernatant liquor will be dependent upon the amount of water present. This amount may be calculated from the solubility coefficient of the alkaline-earth hydrate. The excess of the latter, which remains as a precipitate, may be employed for preparing a fresh peptonizing solution of mixed hydrates, or for re-conversion into the hypochlorite.

One reagent of the kind consists of the supernatant solution obtained by the interaction of ordinary bleaching powder and caustic soda substantially in the proportions of 4-4.5 lbs. of the bleaching powder to 5-5.5 lbs. of the caustic alkali, the quantity of water being about 10 gallons. The mixture is allowed to stand until the precipitate has completely settled, say for 12-20 hours, and the solution is then siphoned off.

1 gallon of this solution will treat 400 lbs. of clay in 4,000 gallons of soft water.

The hypochlorite treatment may be applied in the purification of the clay from unpeptonizable matters, or the sterile peptonization of a clay from which such impurities have already been separated.

Used by themselves, alkaline-earth hydrates, for instance, lime-water, display a flocculating, rather than a deflocculating (peptonizing), action upon clay. On the other hand, the usual effect of hydrates of the alkalies, such as caustic soda, is peptonization of the clay substance. The properties of the solution of mixed hydrates would appear therefore not to be additive. With due regard to the fact, already referred to, that all clays are not necessarily amenable to successful treatment with a given reagent, the general action of the mixed hydrates is to confer an increased stability on the clay suspension, and usually also to give a compact well defined deposit of unpeptonized matters from which the suspension can be readily and economically separated. Moreover, the quantity of caustic alkali requisite for the deflocculation of a given clay will be not infrequently found to be considerably less when employed in conjunction with the alkaline-earth hydrate than when used alone.

For instance, it is known that 2-2½ lbs. of caustic soda will effect the peptonization of 1 ton of Georgia china clay in 10 tons of soft water. The same weight of this clay in the same quantity of water is peptonized by ½-¾ lb. of hydrate of lime in conjunction with 1-1¾ lbs. of caustic soda which, used by itself, is insufficient in this amount to peptonize this weight of clay. The peptonization effected in the second case is more perfect than that produced with the caustic alkali alone in the larger quantity, the clay remaining much longer in suspension, while the impurities separate in the form of a stiffer paste from which the clay suspension can be decanted with greatly diminished liability to contamination. Lime-water alone flocculates this clay.

The quantity of the peptonizing agent necessary for suspending a given clay is affected by the hardness of the water in which the suspension is prepared. While it is preferred to use soft water whenever possible the reagent employed according to the present invention possesses the properties of a water-softener, and therefore renders possible the treatment of clays in waters of at least ordinary degrees of hardness. It may be necessary, however, considerably to increase the quantity of the reagent, for instance, to use double the amount which is requisite for treating the clay in soft water, or even more. The water may be softened prior to, or simultaneously with, the treatment of the clay.

In place of calcium hydrate, barium or strontium hydrate may be used. Other conditions being alike, the greater the solubility of the alkaline-earth hydrate, the less is the amount required for the treatment of a given clay which is amenable to suspension by the mixed hydrate solution.

For the purpose of improving the degree of sterilization of the clay as may be necessary in some cases, the contact of the hypochlorite with the clay suspension, or with the clay separated (for example, flocculated) therefrom, may be maintained for a longer period of time than that required for the peptonization or flocculation treatment in itself. In the case of the suspension, such longer contact may be effected between the suspension before separation thereof from deposited impurities or after separation therefrom, according to the stability of the particular suspension. As a general rule, when clay containing unpeptonizable matters is to be deodorized, a longer period of contact with the hypochlorite is necessary than is required for separation of these impurities, and if the stability of the clay suspension be incompatible with the longer contact period the impurities may first be removed and the suspension then left to stand by itself until the deodorization has been effected.

It is to be understood that the invention is not restricted to the treatment of clay for the separation therefrom of unpeptonizable impurities, but that it may also be applied to clay already free from such impurities, as, for instance, to the peptonization of such a previously purified clay under sterile conditions.

We claim:

1. The process for the purification of clay which comprises effecting peptonization of the clay with a dilute aqueous solution of caustic alkali and alkaline-earth hydrate.

2. The process for the purification of clay which comprises effecting peptonization of the clay with a dilute aqueous solution of caustic alkali and alkaline-earth hydrate, and separating the clay suspension from unpeptonized matters.

3. The process for the purification of clay which comprises effecting peptonization of the clay with a dilute aqueous solution of caustic alkali and alkaline-earth hydrate containing a hypochlorite.

4. The process for the purification of clay which comprises effecting peptonization of the clay with a dilute aqueous solution of caustic alkali and alkaline-earth hydrate containing a hypochlorite, and separating the clay suspension from unpeptonized matters.

5. The process for the purification of clay which comprises effecting peptonization of the clay with a dilute aqueous solution of caustic soda and an alkaline-earth hydrate.

6. The process for the purification of clay which comprises effecting peptonization of the clay with a dilute aqueous solution of caustic soda and hydrate of lime.

7. The process for the purification of clay which comprises effecting peptonization of the clay with a dilute aqueous solution of caustic soda and hydrate of lime containing a hypochlorite.

8. The process for the purification of clay which comprises effecting peptonization of the clay with a dilute aqueous solution of caustic alkali, and an alkaline-earth hydrate in quantity about one-half by weight of the dissolved caustic alkali.

9. The process for the purification of clay which comprises effecting peptonization of the clay by admixture with water containing per each ton of clay substantially 0.5 to 1.0 lb. of dissolved calcium hydrate and substantially 1 to 2 lbs. of caustic soda in appropriately dilute solution for peptonization of the clay.

10. The process for the purification of clay which comprises effecting peptonization of the clay by admixture with the diluted supernatant liquor obtained by the interaction of an alkaline-earth hypochlorite and a caustic alkali in excess of 2 molecular proportions of the alkali to 1 molecular proportion of the hypochlorite in presence of a quantity of water insufficient to dissolve the alkaline-earth hydroxide in amount inhibitive to effective peptonization of the clay.

11. The process for the purification of clay which comprises effecting peptonization of the clay by admixture with the diluted supernatant liquor obtained by the interaction of bleaching powder and caustic soda in excess of 2 molecular proportions of the caustic soda to 1 molecular proportion of the hypochlorite in presence of a quantity of water insufficient to dissolve the calcium hydrate in amount inhibitive to effective peptonization of the clay.

12. The process for the purification of clay which comprises effecting peptonization of the clay by admixture with the diluted supernatant liquor obtained by the interaction of about 4 molecular proportions of caustic alkali with about 1 molecular proportion of an alkaline-earth hypochlorite in presence of a quantity of water insufficient to dissolve the alkaline-earth hydroxide in amount inhibitive to effective peptonization of the clay.

13. The process for the purification of clay which comprises effecting peptonization of the clay by admixture with the diluted supernatant liquor obtained by the interaction of about 5 to 5.5 lbs. of caustic soda with about 4 to 4.5 lbs. of bleaching powder in presence of about 10 gallons of soft water.

14. The process for the purification of clay which comprises effecting peptonization of the clay with a dilute aqueous solution of caustic alkali and alkaline-earth hydrate containing a hypochlorite and maintaining contact between the hypochlorite and the clay at any desired stage of treatment of the latter for a longer period of time than normally required for the same stage of treatment until the desired degree of sterilization of the clay has been effected.

In testimony whereof we have signed our names to this specification in the presence of two subscribing witnesses.

WILLIAM FELDENHEIMER.
WALTER WILLIAM PLOWMAN.

Witnesses:
  Harry T. Fridge,
  Frank Moore.